United States Patent
Kandhalu Raghu et al.

(10) Patent No.: US 9,565,689 B2
(45) Date of Patent: Feb. 7, 2017

(54) NEAR-OPTIMAL QOS-BASED RESOURCE ALLOCATION FOR HYBRID-MEDIUM COMMUNICATION NETWORKS

(71) Applicant: Texas Instruments Incorporated, Dallas, TX (US)

(72) Inventors: Arvind Kandhalu Raghu, Dallas, TX (US); Ariton E. Xhafa, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 65 days.

(21) Appl. No.: 14/522,153

(22) Filed: Oct. 23, 2014

(65) Prior Publication Data

US 2015/0124742 A1     May 7, 2015

Related U.S. Application Data

(60) Provisional application No. 61/894,760, filed on Oct. 23, 2013.

(51) Int. Cl.

| | |
|---|---|
| *H04W 72/08* | (2009.01) |
| *H04L 12/927* | (2013.01) |
| *H04W 28/24* | (2009.01) |
| *H04W 24/02* | (2009.01) |
| *H04L 12/729* | (2013.01) |
| *H04W 40/12* | (2009.01) |
| *H04L 12/725* | (2013.01) |

(52) U.S. Cl.
CPC .......... *H04W 72/087* (2013.01); *H04L 45/125* (2013.01); *H04L 45/302* (2013.01); *H04L 47/805* (2013.01); *H04W 24/02* (2013.01); *H04W 28/24* (2013.01); *H04W 40/12* (2013.01)

(58) Field of Classification Search
CPC .... H04L 12/5695; H04L 47/805; H04L 47/24; H04L 41/0896; H04L 41/5022; H04L 45/125; H04L 45/302; H04L 67/322; H04L 5/006; H04W 24/02; H04W 28/24; H04W 28/26; H04W 72/04; H04W 72/087; H04W 40/12; H04W 52/26; H04W 52/265
See application file for complete search history.

(56) References Cited

U.S. PATENT DOCUMENTS

| | | | |
|---|---|---|---|
| 7,116,699 B2 | 10/2006 | Batra et al. | |
| 7,197,048 B1 * | 3/2007 | Duffield | H04L 12/4641 370/231 |
| 7,236,511 B2 | 6/2007 | Batra et al. | |
| 7,411,926 B2 | 8/2008 | Batra et al. | |
| 7,532,610 B2 | 5/2009 | Batra | |

(Continued)

*Primary Examiner* — Yemane Mesfin
*Assistant Examiner* — Peter Chen
(74) *Attorney, Agent, or Firm* — Kenneth Liu; Charles A. Brill; Frank D. Cimino

(57) ABSTRACT

Embodiments of the invention provide a method for performing network resource allocation over hybrid networks so that application QoS requirements are met. The hybrid networks are represented as an undirected weighted graph with the communication links as edges irrespective of the communication medium. A QoS-based resource allocation model. Another embodiment further includes utility functions that capture the QoS attributes such as reliability, timeliness, fault-tolerance and lifetime allows determining routes and bandwidth allocation such that the total system utility across the entire network is maximized.

20 Claims, 2 Drawing Sheets

(56) References Cited

U.S. PATENT DOCUMENTS

| | | | |
|---|---|---|---|
| 7,773,560 B2 | 8/2010 | Batra et al. | |
| 2002/0199012 A1* | 12/2002 | Cable | H04L 29/06 |
| | | | 709/233 |
| 2003/0147453 A1 | 8/2003 | Batra | |
| 2006/0245356 A1* | 11/2006 | Porat | H04L 12/5695 |
| | | | 370/232 |
| 2007/0268860 A1* | 11/2007 | Taneja | H04L 27/2608 |
| | | | 370/329 |
| 2008/0040630 A1* | 2/2008 | Travostino | H04L 12/5695 |
| | | | 714/11 |
| 2010/0131651 A1* | 5/2010 | Jeong | G06F 15/173 |
| | | | 709/226 |

\* cited by examiner

NEAR-OPTIMAL QOS-BASED RESOURCE ALLOCATION FOR HYBRID-MEDIUM COMMUNICATION NETWORKS

CROSS REFERENCE TO RELATED APPLICATIONS

This application claims priority under 35 U.S.C. 119 to U.S. Provisional Patent Application No. 61/894,760, filed Oct. 23, 2013. Said application is incorporated herein by reference.

BACKGROUND

Embodiments of the invention are directed, in general, to communication systems and, more specifically, resource allocation for hybrid-medium communication networks.

Hybrid network systems offer different communication mediums for use within the network. Such systems offer greater flexibility with respect to system design and deployment. However, the system complexity increases especially with respect to choice of medium to use, route selection and bandwidth resource allocation. The problem of efficient use of multiple communication mediums in network system to enhance the Quality of Service (QoS) of applications operating in that network is particularly gaining a lot of interest from industry and academia.

BRIEF DESCRIPTION OF THE DRAWINGS

Figure 1:
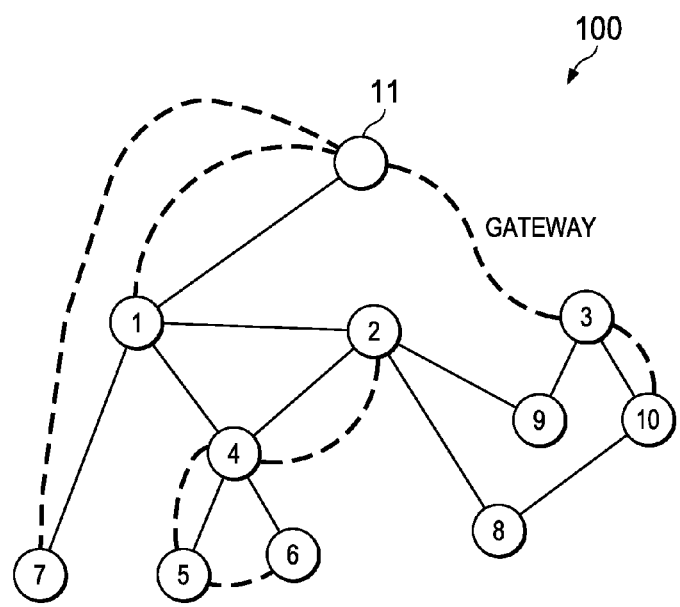

Having thus described the invention in general terms, reference will now be made to the accompanying drawings, which are not necessarily drawn to scale, and wherein:

FIG. 1 shows an example network system.

Figure 2A:
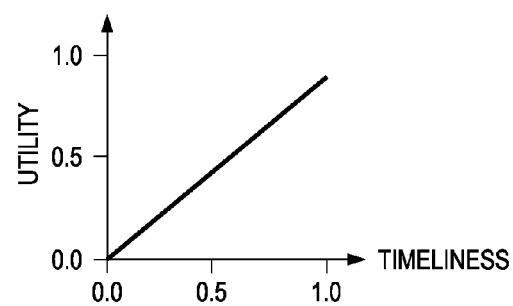
Figure 2B:
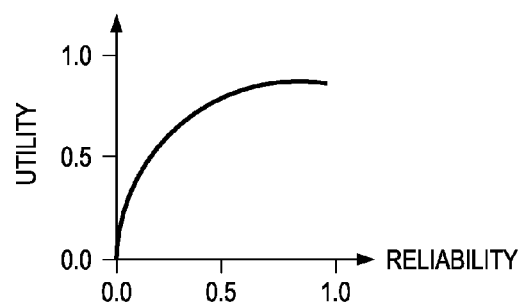

FIGS. 2A and 2B are plots showing QoS vs utility curves for timeliness and reliability QoS requirements of an example task.

Figure 3:
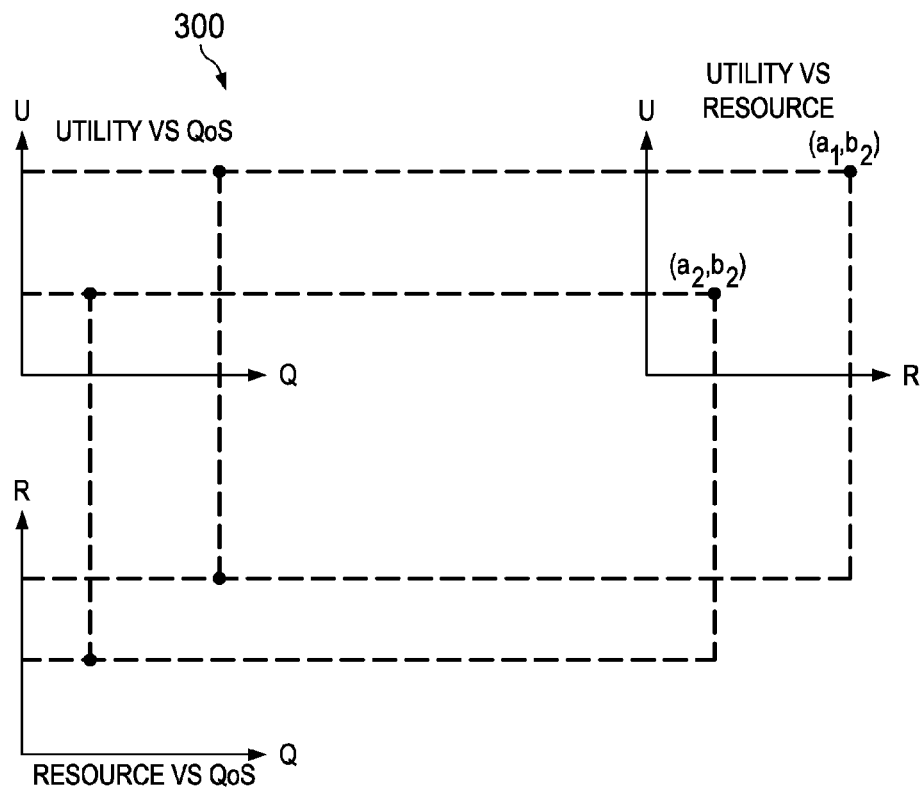

FIG. 3 shows mapping of the utility vs resource profile from utility vs QoS and resource vs QoS as obtained from Q-RAM.

Figure 4:
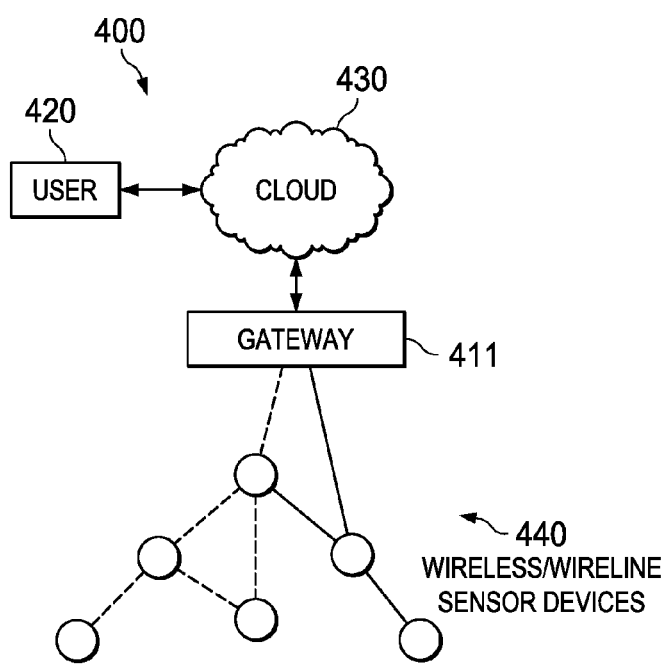

FIG. 4 is a diagram showing the environment in which embodiments of the invention are implemented and operate.

Figure 5:
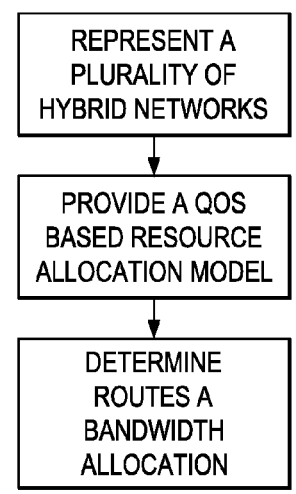

FIG. 5 is a flowchart of a method in accordance with an embodiment.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

In various embodiments, the systems and methods described herein may be used to design and/or implement communications in beacon-enabled networks. Generally speaking, these systems and methods may be applicable to a wide variety of communication environments, including, but not limited to, those involving wireless communications (e.g., cellular, Wi-Fi, WiMax, etc.), wired communications (e.g., Ethernet, etc.), power line communications (PLC), or the like. For ease of explanation, several examples discussed below are described specifically in the context of PLC. As a person of ordinary skill in the art will recognize in light of this disclosure, however, certain techniques and principles disclosed herein may also be applicable to other communication environments.

Consider the example network system 100 shown in FIG. 1. There could be multiple applications or tasks operating in the network nodes each transmitting data to a gateway node 11. The communication links between nodes can be wired (power line communication, Ethernet, or the like) as well as wireless (802.15.4, 802.11, or the like) each having varying degrees of link quality and bandwidth. Certain nodes may be battery operated while certain others may be directly operated from the power lines. Circles represent network nodes. Solid lines represent wired connectivity links. Dotted lines represent wireless connectivity links. Note that there could be variation in communication technology within wired or wireless. For example, certain wired lines could be power line communication while others could be Ethernet.

Such a system having multiple tasks contending for system resources should satisfy multiple QoS requirements in terms of delay, reliability, network lifetime and bandwidth. The system should decide the fraction of its resources (communication link bandwidth and route) to be allocated to each of the tasks. The tasks have multiple QoS dimensions while there are multiple resources (bandwidth and different communication mediums). This results in a multi-resource resource allocation problem. The problem of selecting routes and allocating bandwidth to tasks with multiple QoS dimensions is known to Non-deterministic polynomial-time hard (NP-hard). Additionally, in hybrid networks nodes may have links with different communication mediums each having differing channel characteristics and available bandwidth. A local decision by a node to use an edge with a particular type of communication medium may affect the route involving multiple nodes for the entire network. Hence, route and bandwidth allocations should consider the impact of communication medium choice not only at a particular node but for the entire network as a whole.

Techniques for hybrid nodes usually make decisions for that particular node alone not considering the entire network's performance. Local decisions at a node may affect the global optimal. The embodiments consider the entire network and try to maximize the utility of the system for the global network.

QoS-based resource allocation mechanisms have been proposed in the past. However, the instant embodiments provide a framework that has been adapted for hybrid networks as well as for requirements such as fault-tolerance for networks.

Embodiments of the invention represent the hybrid multi-medium network as an undirected multi-graph with each of the link from a multi-medium node just being an additional edge in the graph. The QoS-based Resource Allocation-Model (Q-RAM) is used as the basis of our optimization framework, whereby each task derives a utility based on the amount of its allocated resources. The resource here is bandwidth on the chosen edge. Our optimization treats the multi-medium edges as any other edge in the graph. This allows for abstracting the details of the physical medium being used and instead allows for focusing on choosing the routes depending on QoS requirements only such as latency, lifetime and reliability. The embodiments maximize the total utility derived across all missions while meeting the resource constraints. Q-RAM solutions are known to be near-optimal. The resulting solution will provide the route selection and the bandwidth allocations along the selected routes. The route selection includes choice of the best medium to be used among the available mediums to use at a node. Also, note that while Q-RAM has been applied for multi-core processor and network resource management in the past, they have not addressed multi-medium networks with reliability, fault-tolerance and lifetime QoS requirements.

The embodiments consider a set of tasks that transfer "messages" from one node in a network to another node. The embodiment QoS model is defined in terms of a per-mission QoS space, an operational space and a shared resource space. Each of these spaces is defined by a set of dimensions. QoS dimensions represent the aspects of routing that are of direct interest to the user such as delay of the end-to-end route. Operational dimensions represent aspects of the task that can be directly controlled by the system such as which link to transmit on, amount of bandwidth to use and so on. While the operational dimensions affect the QoS, they are not of direct interest to the user. For each point in the QoS space of each task, there is a utility value $u_i$ representing the benefit to tasks operating at that quality level. The QoS for a task is a function of the selected point in the operational space (also called the set-point). The objective of the Q-RAM optimizer is to choose a point from the set-points for each task $\tau_i$ so as to maximize the weighted sum of utility values over all missions.

The Q-RAM model for the resource allocation problem in multi-medium networks. The entire network is represented as a connected undirected graph G=(V, E), where V denotes the set of vertices and E denotes the number of edges. The vertices of a graph represent nodes capable of routing packets (or messages) and the edges represent links. Note that in the disclosed system, a pair of nodes may have multiple links with different communication mediums. The bandwidth across each link $e_j$ is expressed as the capacity $c_j$ of an edge in the graph. A task essentially sends data from a source node x to a destination node y. $P_G(x, y)$ is defined to be the set of all possible routes from x to y. $p_G(x,y) \in P_G(x,y)$ is defined as a particular route from x to y. This is formed by joining or concatenating a set of edges that connect x and y.

QoS and utility functions are provided. Note that there will be multiple tasks in a system each with their own "level" of QoS requirement and weights. A task $\tau$ is modeled by five parameters (C, T, D, x, y), where C is the message size, T is the inter-arrival time or period at which the message is sent, D is the end-to-end deadline, x is the source and y is the destination.

Timeliness ($\alpha$):

As mentioned earlier, certain tasks may be highly time-critical requiring that they transmit their data to the gateway 11 as soon as possible such as a surveillance alarm or industrial machine control. Some other tasks can be transmitting regular monitoring information such as humidity and so on. To capture the latency related QoS attribute, timeliness is given by:

$$\alpha = \frac{L_{max} - L_{actual}}{L_{max}}$$

Where $L_{max}$ is the maximum delay or the end-to-end deadline of a task and $L_{actual}$ is the actual delay of the route assigned to the task. If the latency is greater than $L_{max}$ then the mission is said to have failed. Hence $L_{actual}$ may never be greater than $L_{max}$. Note that the value of $\alpha$ will vary from 0 (when $L_{actual}=L_{max}$) to 1 (when $L_{actual}=0$).

The link delay will depend on the total bandwidth, propagation and switching delay of the link. The route delay may further be affected by the number of hops as well. The utility function for timeliness is defined as: $U(\alpha)=W_\alpha \times \alpha$, where $W_\alpha$ is a weight factor which depends on the priority and type of mission. The utility function plot is shown in FIG. 2(A).

Reliability ($\beta$):

In communication networks, packet loss may occur due to multiple reasons such as collisions, external interference, congestion and so on. The most reliable route will be the one with the least packet loss probability (PLP). The PLP for a route is essentially the product of the probabilities of the individual links and is given by $$\beta = 1 - \{\Pi_{i,j} PLP(i,j)\}, \forall i,j \in p_G(x,y),$$

where $\beta$ is a measure of route reliability. A low value of $\beta$ corresponds to high packet loss (poor QoS) and a high value of $\beta$ corresponds to low packet loss (good QoS). The per-link PLP may be obtained by keeping track of the number of inflow packets and the number of successfully transmitted packets (successful implies node received acknowledgement of transmission). Also note that PLP depends on the particular layer within the network stack being considered. The utility of message delivery reliability is defined as $U(\beta)=W_\beta(1-e^{-\beta})$, where $W_\beta$ is the weight factor. According to the above equation, the utility increases with increase in successful packet transmission probability and ultimately saturates at very high reliability. The utility function plot for reliability is shown in FIG. 2B.

Fault Tolerance ($\gamma$):

Fault tolerance QoS is especially needed for applications in critical and safety related infrastructure. Well known fault tolerance techniques involve replication or redundancy both of which require multiple instances (on many occasions identical as well). In case of networks, multiple routes between a pair of nodes can be used as multiple instances. This allows for handling faults in nodes or link failures. Increasing the number of instances essentially increases the fault tolerance. However, the marginal utility increase for fault tolerance QoS after a certain number of replicas is lower. This can be modeled by a concave function as used earlier for reliability QoS given as $U(\gamma)$ and weight $W_\gamma$.

Lifetime ($\rho$):

Certain nodes in a network may be battery operated thereby providing limited energy supply. Extending the operating lifetime of a node may be a critical QoS requirement to maximize functionality of the network. The inter-arrival time of period of the task may also be treated as the duty cycle of the node. The duty-cycle may be obtained as C/{phy-rate*T}, where phy-rate is the maximum rate of transmission of the physical medium. The duty-cycle in turn determines the lifetime. The lifetime of a task that transmits a message over multiple hops is essentially the minimum of the lifetimes of each of the nodes in that path. We model the lifetime QoS function as well as the associated utility functions as linear functions.

Operational Dimensions

Using the edges of the graph as network links with a certain amount of bandwidth R, a resource capacity vector $\vec{R}=R_1, \ldots, R_m$ is constructed where m is the total number of edges of the graph and $R_i$ is the bandwidth of the $i^{th}$ edge. The operational dimensions of each task is enumerated as follows:

Set of bandwidth settings: The number of choices of bandwidth settings of task $\tau_i$ is given by:

$$B_i = \{b_{i1}, \ldots, b_{iN_i^\beta}\},$$

where $N_i^\beta$ is the number of possible bandwidth settings. The bandwidth maps directly to the resource requirement on the network link.

Set of routes: The number of choices of routes for task $\tau_i$ is given by $P_i$. For a connected graph $|P_G(x,y)| \geq 1$. Note that the routes include links between the same pair of nodes with different communication medium. The set of all possible routes can be determined by many methods. One example is for the source node to broadcast its route discovery request to all of its neighbors. Then each of the neighbors will further broadcast the request until the destination is reached. Then the destination essentially has all possible routes from the source.

Set of timeliness setting: The timeliness setting is also an operational dimension. It constraints the set of all possible routes within a particular timeliness setting. The timeliness settings are given by $$A_i = \alpha_{i1}, \ldots, \alpha_{iN_i^\alpha},$$

where $N_i^\alpha$ is the number of possible timeliness settings.

Optimization Algorithm

The set-points of the missions are obtained as $S_i : B_i \times A_i \times P_i$. The utility of a set-point is obtained from the QoS dimensions as $\alpha \times \beta \times \gamma \times \rho \to u$, while the corresponding resource requirements are obtained as $B_i \times P_i \to R$. Thus a set-point is represented by $\{q_j, u_j, (r_{j1}, \ldots, r_{jm})\}$, where $q_j$ is the quality level, $u_j$ is the utility level and $(r_{j1}, \ldots, r_{jm})$ is the resource vector representing resource requirement at each edge of the system.

As can be seen the resource vector consists of allocations across all the edges for a given path. Therefore, to determine and compare the "costs" of the resource vectors to choose one which gives higher utility at lower cost, a scalar metric that describes the cost of allocating resources called compound resource ($h_j$) is also added to each of the set-points. The compound resource is computed using a penalty vector for the resources that assigns a "price" on each resource. The value of an element in the vector is directly related to the overall demand of the corresponding resource.

Thus, the utility vs. quality profile may be obtained as well as the utility vs. resource profile of each of the tasks. A simple example of the mapping is shown in FIG. 3.

To determine the optimal resource allocation, an exhaustive search could be performed across all of the tasks. The running time of the exhaustive search may be large due to the large number of set points. For k dimensions having m settings, there are $m^k$ set-points. Therefore, a concave majorant operation may be performed to reduce the number of set-points. The concave majorant is the subset of the path on the convex hull of the points on the aggregate utility curve starting from the minimum resource allocation point to a point with the highest achieved value of utility. The optimization algorithm is given below.

Inputs: utility vs resource profile of tasks
Outputs: route and bandwidth allocation of tasks by maximizing utility 1. for each task $\tau_i$ i=0 to n (where n is the maximum number of tasks)
   a. Obtain QoS points as $\alpha$, $\beta$, $\gamma$, and $\rho$ (representing timeliness, reliability, fault tolerance, and lifetime, respectively)
   b. Determine the feasible set of routes $P_i$
   c. Generate set-points $S_i : \beta_i \times A_i \times P_i$ for $\tau_i$ and map to resource requirements $S_i \to R$ in terms of edge bandwidths
   d. Determine compound resource as a scalar cost metric for each set-point
   e. Determine concave majorant of the set-points based on their (compound resource, utility) values and the corresponding gradient
2. Merge set-points of n tasks with decreasing values of their gradients
3. Perform a global resource allocation starting with the point of highest gradient Hybrid networks have the potential to be used in a wide variety of industrial and automotive applications. The embodiments consider the route selection including choice of communication medium for the network as a whole. It provides near-optimal resource allocation considering key QoS requirements such as reliability, timeliness, lifetime and fault tolerance.

FIG. 4 is a diagram showing the environment in which embodiments of the invention are implemented and operate. The circles 440 represent low-power devices such as CC26xx or C2000 power line devices from Texas Instruments (Dallas, Tex.). The dashed links represent wireless links (such as Zigbee for example) and the regular lines represent power lines. The gateway 411 may be a processor that is not power constrained. Texas Instruments' Sitara processors are examples of processors based on the Advance RISC Machine (ARM) Cortex-A core. The cloud 430 could be using any of TI's keystone processors such as in Hewlett Packard (Palo Alto, Calif.) Moonshot system. The user 420 specifies QoS in terms of the rate at which they want to receive sensor data updates as well as the resolution of the sensor data. The higher the rate and resolution the better the utility of the user (linear relation). The resource in terms of the links (bandwidth) will of course increase with higher QoS. The QoS and utility may be sent to the cloud 430 by the user 420. The user may also only send QoS and the corresponding utility may be inferred by a mapping function. The available resources may be obtained at the gateway 411 by transmissions made from the wireless and power line devices 440. The available resources may then be sent to the cloud 430 from the gateway 411 or maintained at the gateway 411. The resource allocations maximizing the utility may finally be obtained either at the gateway 411 or at the cloud 430. The actual enforcements of the resource usage of course has to be performed by the under-lying network protocol in use. Therefore using this framework near-optimal performance with respect to network load and power usage can be obtained for a wide array of devices.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

We claim:

1. A method for resource allocation in a network, the method comprising:

representing the network as an undirected graph with vertices of the graph representing a plurality of nodes of the network for routing data packets and with edges of the graph representing communication links of the network;

for each of a plurality of tasks assigned to the network, using a quality of service (QoS)-based resource allocation model (Q-RAM) to:
- determine one or more QoS points for the task based on at least one of a timeliness factor, a reliability factor, a fault tolerance factor, and a lifetime factor;
- determine a set of available bandwidth settings;
- determine a set of available routes;
- determine a set of available timeliness settings;
- determine set-points for the task, each set-point including a selected one of the bandwidth settings, a selected one of the available routes, and a selected one of the available timeliness settings; and
- for each set-point, determine a utility level based on the one or more QoS points, determine a resource requirement value for each edge associated with the selected route and determine a resource allocation penalty metric for each edge; and based upon the utility levels and resource allocation penalty metrics corresponding to the set-points associated with the plurality of tasks, determining route and bandwidth allocations for the network.

2. The method of claim 1, wherein the network comprises a hybrid-medium network and the plurality of nodes includes at least a first node and a second node, the first and second nodes being connected in the graph by two or more edges, each edge representing a different communication medium.

3. The method of claim 1, wherein the edges of the graph are weighted based on the resource requirement values for each edge associated with the selected route for a given set-point of the set-points.

4. The method of claim 1, wherein each task is defined by a message size parameter, a time factor parameter indicative of when a message is sent, an end-to-end deadline parameter, a source node, and a destination node.

5. The method of claim 4, wherein the set of available routes comprises all sets of edges in the graph that define a route from the source node and the destination node.

6. The method of claim 1, wherein the resource allocation penalty metric for each edge is based upon an overall demand for resources associated with that edge.

7. The method of claim 1, wherein determining the route and bandwidth allocations for the network based upon on the utility levels and resource allocation penalty metrics corresponding to the set-points associated with the plurality of tasks comprises:
- determining, from a curve of the utility levels for each set-point, a concave majorant subset of the set-points;
- ordering the set-points of the concave majorant subset according to a gradient value associated with each of the set-points; and
- determining the route and bandwidth allocations for the network beginning with the set-point having the highest gradient value.

8. The method of claim 1, wherein the Q-RAM model is defined by a QoS space having a plurality of dimensions, an operational space having a plurality of dimensions, and a resource space.

9. The method of claim 8, wherein the dimensions of the QoS space include the timeliness factor, the reliability factor, the fault tolerance factor, and the lifetime factor.

10. The method of claim 9, wherein determining the one or more QoS points for each task comprises determining each of a timeliness factor, a reliability factor, a fault tolerance factor, and a lifetime factor for the task.

11. The method of claim 8, where determining the utility level for each set-point comprises applying a respective weight factor to each of the QoS space dimensions to obtain utility function curves for each of timeliness, reliability, fault tolerance, and lifetime, and determining the utility level in accordance with the utility function curves.

12. The method of claim 11, wherein the utility function curves for timeliness and lifetime are substantially linear, and the utility function curves for reliability and fault tolerance are substantially concave.

13. The method of claim 8, wherein the dimensions of the operational space include the set of available bandwidth settings, the set of available routes, and the set of available timeliness settings.

14. The method of claim 1, wherein the resource requirement values of the edges associated with the selected route are represented as a first vector and the resource allocation penalty metrics of the edges associated with the selected route is represented as a second vector, wherein a scalar metric describing resource allocation cost is determined using the second vector for each set-point, and wherein determining route and bandwidth allocations for the network based upon the utility levels and resource allocation penalty metrics includes using the scalar metric for resource allocation cost for each set-point.

15. The method of claim 14, wherein the resource allocation cost is a cost expressed in terms of utility and quality of service (QoS).

16. The method of claim 1, wherein determining route and bandwidth allocations for the network based on the utility levels and resource allocation penalty metrics comprises selecting route and bandwidth allocations in a manner that prioritizes highest utility and lowest resource allocation penalty.

17. The method of claim 1, wherein the resource requirement value for each comprises a bandwidth associated with the edge.

18. A computer program product embodied in a non-transitory computer-readable medium, the non-transitory computer-readable medium storing instructions that, when executed by a processor, causes the processor to:
- represent a network as an undirected graph with vertices of the graph representing a plurality of nodes of the network for routing data packets and with edges of the graph representing communication links of the network;
- provide a quality of service (QoS)-based resource allocation model (Q-RAM) and, for each of a plurality of tasks assigned to the network, use the Q-RAM to:
  - determine one or more QoS points for the task based on at least one of a timeliness factor, a reliability factor, a fault tolerance factor, and a lifetime factor;
  - determine a set of available bandwidth settings;
  - determine a set of available routes;
  - determine a set of available timeliness settings;
  - determine set-points for the task, each set-point including a selected one of the bandwidth settings, a selected one of the available routes, and a selected one of the available timeliness settings; and
  - for each set-point, determine a utility level based on the one or more QoS points, determine a resource requirement value for each edge associated with the selected route and determine a resource allocation penalty metric for each edge; and based upon on the utility levels and resource allocation penalty metrics corresponding to the set-points associated with the plurality of tasks, determining route and bandwidth allocations for the network.

19. The computer program product of claim 18, wherein the instructions causing the processor to determine route and bandwidth allocations for the network based upon on the utility metrics and resource allocation penalty metrics corresponding to the set-points associated with the plurality of tasks include instructions causing the processor to:

determine a curve of the utility levels for each set-point;

determine, from the curve of the utility levels, a concave majorant subset of the set-points;

sort the set-points of the concave majorant subset according to a gradient value associated with each of the set-points; and determine the route and bandwidth allocations for the network beginning with the set-point having the highest gradient value.

20. The computer program product of claim 18, wherein the resource allocation penalty metric for each edge is based upon an overall demand for resources associated with that edge.

* * * * *